United States Patent
Malomsoky et al.

(10) Patent No.: US 7,158,527 B2
(45) Date of Patent: Jan. 2, 2007

(54) PROTOCOL MULTIPLEXING

(75) Inventors: Szabolcs Malomsoky, Szentendre (HU); Szilveszter Nádas, Mezőtúr (HU); Sándor Rácz, Budapest (HU)

(73) Assignee: Telefonaktiebolaget Lmeericsson (publ), Stockholm (SE)

( * ) Notice: Subject to any disclaimer, the term of this patent is extended or adjusted under 35 U.S.C. 154(b) by 1050 days.

(21) Appl. No.: 10/113,941

(22) Filed: Apr. 2, 2002

(65) Prior Publication Data
US 2003/0185213 A1    Oct. 2, 2003

(51) Int. Cl.
*H04L 12/28* (2006.01)

(52) U.S. Cl. .................. 370/414; 370/395.6; 370/235

(58) Field of Classification Search ............... None
See application file for complete search history.

(56) References Cited

U.S. PATENT DOCUMENTS

| | | | |
|---|---|---|---|
| 6,870,847 B1 * | 3/2005 | Hughes et al. | 370/395.1 |
| 6,975,651 B1 * | 12/2005 | Ono et al. | 370/474 |
| 2001/0030966 A1 | 10/2001 | Choi | |
| 2002/0093962 A1 * | 7/2002 | Lo et al. | 370/395.1 |
| 2003/0123451 A1 * | 7/2003 | Nielsen et al. | 370/395.4 |

FOREIGN PATENT DOCUMENTS

| | | |
|---|---|---|
| EP | 1 065 908 A1 | 1/2001 |
| WO | 99/60798 A2 | 11/1999 |

OTHER PUBLICATIONS

ITU-T Recommendation 1.363.2, Series I: Integrated Services Digital Network, Overall Network Aspects and Functions—Protocol Layer Requirements; B-ISDN ATM Adaptation Layer Specification: Type 2 AAL, Nov. 2000.
ITU-T Recommendation Q.2630.1, Series Q: Switching and Signalling, Broadband ISDN—Common Aspects of B-ISDN Application Protocols for Access Signalling and Network Signalling and Interworking, AAL Type 2 Signalling Protocol—Capability Set 1, Dec. 1999.
Liu et al, "Packing Density of Voice Trunking Using AAL2", Submitted to Globecom 1999 General Conference.
U.S. Appl. No. 09/188,102, filed Nov. 9, 1998 entitled "Asynchronous Transfer Mode System Handling Differing AAL Protocols".
Chung et al, "Performance Evaluation of an AAL2 Link Transmission Scheme for Voice and Data Packets in BS-BSC Links", Vehicular Technology Conf., 2000, IEEE CIC 2000, 52$^{nd}$ Sep. 24, 2000-Sep. 28, 2000, Boston, MA, USA, vol. 2, 2000, pp. 1610-1614.
Makke et al, Performance of the AAL2 Protocol Within the UTRAN, Universal Multiservice Networks, 2002, ECUMN, Second European Conference, 2002, pp. 92-100.

* cited by examiner

*Primary Examiner*—Bob A. Phunkulh
(74) *Attorney, Agent, or Firm*—Nixon & Vanderhye, P.C.

(57) ABSTRACT

Example embodiments of protocol multiplexing systems comprise a multiplexer which receives multiplexed packet(s) and which uses contents of the multiplexed packets to form carrying packets which are stored in an output buffer. Some of the multiplexed packets belong to differing ones of plural virtual channels, but the multiplexer uses multiplexed packet(s) belonging to only one virtual channel to form a given carrying packet. The multiplexing systems accommodate transmission on a same virtual path of numerous connections belonging to differing virtual channels, balancing both payload efficiency and delay considerations.

71 Claims, 7 Drawing Sheets

PROTOCOL MULTIPLEXING

BACKGROUND

1 Field of the Invention

The present invention pertains to the multiplexing of multiplexed packets into carrying packets, such as (for example) the multiplexing of AAL2 packets into ATM cells.

2. Related Art and Other Considerations

Packet multiplexing protocols typically multiplex a packet of a given type (multiplexed packet) into one or more packets of another type (carrying packets). An example of a multiplexing protocol can be AAL2 (ATM Adaptation Layer 2), whose variable-sized packets can be multiplexed into fixed sized ATM cells (ATM cells being the carrying packets). This particular example is described in ITU-T, AAL2 Type 2 Signalling Protocol (Capability Set 1), New ITU-T Recommendation Q.2630.1, December 1999), which is incorporated herein by reference in its entirety. See also U.S. patent application Ser. No. 09/188,102, entitled "ASYNCHRONOUS TRANSFER MODE SYSTEM HANDLING DIFFERING AAL PROTOCOLS," which is also incorporated herein by reference in its entirety.

For fixed-sized carrying cells, one objective in performing the multiplexing is that the unused payload of a carrying packet should be minimized, i.e., the multiplexer should send out a carrying packet (e.g., an ATM cell in the foregoing example illustration) with as full a payload as possible (most preferably with a full payload). For carrying packets of variable size, the objective is instead to maximize transmission efficiency by multiplexing as many multiplexed packets as possible into a carrying packet. Yet for both type carrying packets there is also the essentially contradictory objective that packet delay on the link transmitting the carrying cells should be minimized. This second objective encourages the multiplexer to send out a carrying packet as early as possible (e.g., without having to wait unduly for the payload to be filled with user data) or for more multiplexed packets to be included.

Multiplexed packets from different sources (different connections) are distinguished by connection identifiers (CIDs). Since the CIDs are coded with a predetermined (and typically standardized) number of bits, the number of connections that can be distinguished by the CIDs is limited in accordance with the number of bits so allotted for the coding. For example, for AAL2 at most two hundred forty eight (248) connections can be multiplexed onto one ATM VC (Virtual Channel), the virtual channel being identified by a VCI (Virtual Channel Identifier).

Figure 4:
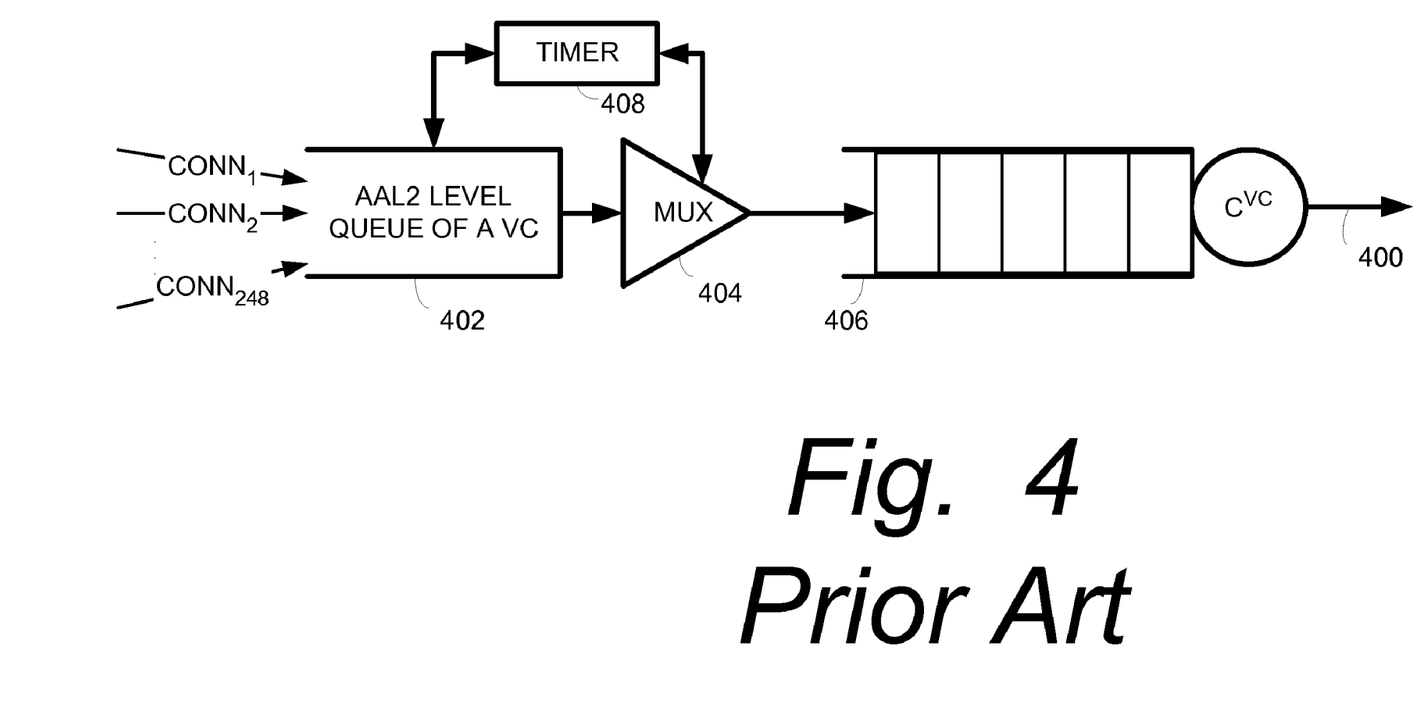
FIG. 4 is a schematic view of a conventional protocol multiplexing system.

FIG. 4 illustrates a typical state of the art protocol multiplexing situation in which a maximum of two hundred forty eight (248) AAL2 connections can be multiplexed into an ATM VC. In FIG. 4, AAL2 packets from connections $conn_1$ through $conn_{248}$ are multiplexed into ATM cells for output on a channel identified as VC 400. The ATM channel VC 400 has a capacity of $C^{VC}$ (cells/sec). Upon arrival, the packets from connections $conn_1$ through $conn_{248}$ (having respective connection identifiers $CID_1$ through $CID_{248}$) are stored in queue 402. Queue 402 is an AAL2 level queue for VC 400. An AAL2 multiplexer 404 multiplexes the AAL2 packets stored in queue 402 into an output buffer 406 for ATM channel VC 400.

In an attempt both to optimize the delay and the unused payload of the carrying packet, state of the art protocol multiplexing systems such as that shown in FIG. 4 usually have a single timer 408. When an ATM cell (e.g., carrier cell) cannot be fully filled by multiplexer 404, the timer 408 starts counting down from a predetermined maximum value (e.g., 1 millisecond).

If the ATM cell can be filled before timer 408 expires, the filled ATM cell is sent out on the VC. The timer 408 is then restarted for the next outgoing ATM cell on the VC. But if the ATM cell cannot be filled before timer 408 expires, the partially-filled ATM cell is sent to ATM output buffer 406 (thereby limiting the delay). The timer 408 is then restarted if a carrying packet (e.g., ATM cell) cannot be filled by multiplexer 404, and queue 402 is devoid of any multiplexed packets (AAL2 packets) for the next outgoing ATM cell from the multiplexer 404. By tuning this maximum timer value it is possible to achieve a compromise between the duration of the multiplexing procedure and unused ATM payload.

In many cases it would be advantageous to have a larger number of connections involved in the multiplexing (e.g., a larger than conventional number of CIDs). The advantage is related to the fact that multiplexing more connections over a larger resource increases multiplexing efficiency. But to multiplex more AAL2 connections, for example, there must be more multiplexers identified by different virtual channel identifiers (VCIs). A simplified approach in this regard would be to construct a large FIFO queue from many CID limited (e.g., small) FIFO queues, but in a manner to keep packets of differing AAL2 connections, which are associated with different VCIs, from being multiplexed into the same ATM cell (keeping in mind that an ATM cell should carry only packets of AAL2 connections multiplexed wihtin one VC).

Figure 5:
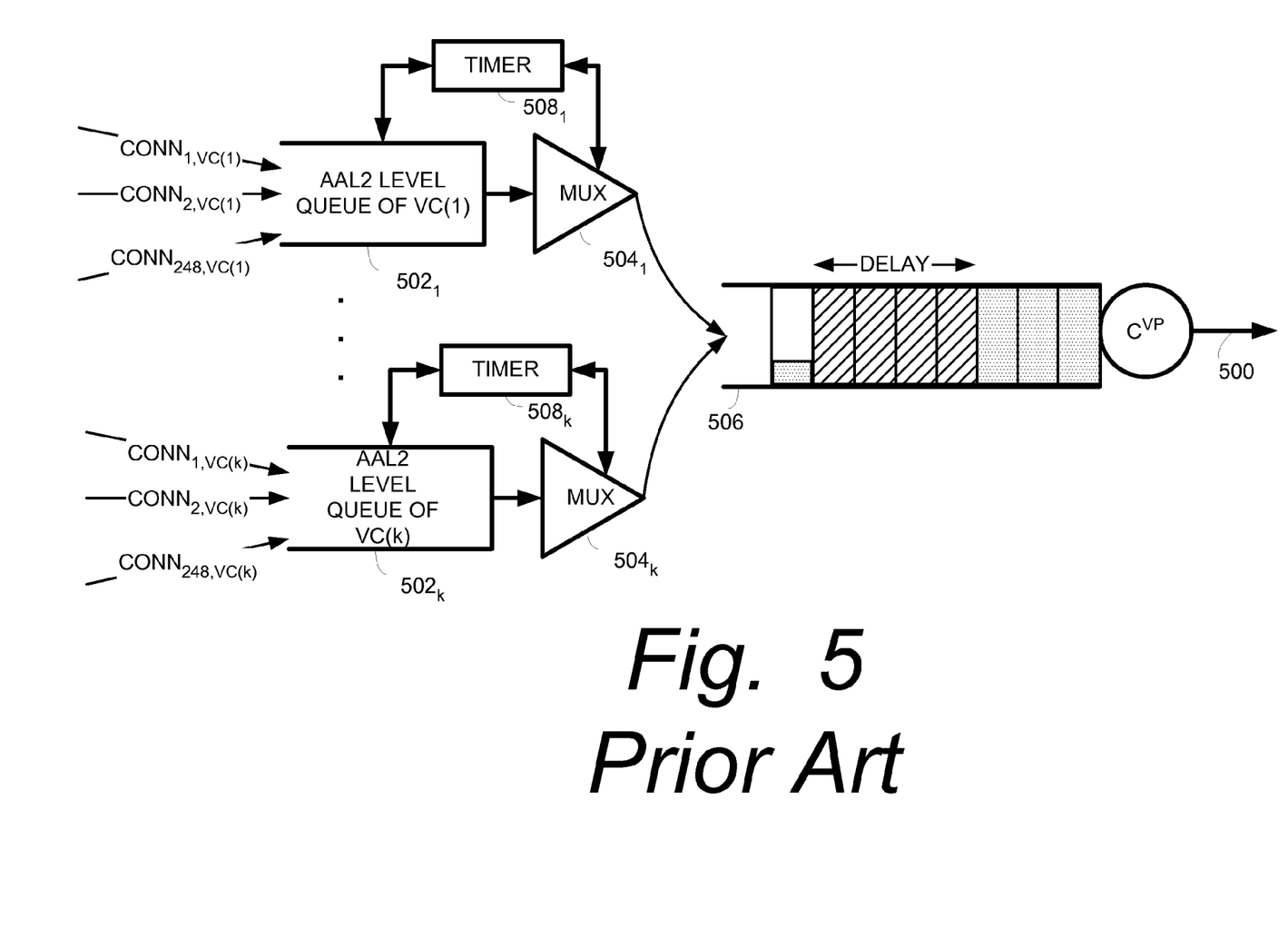
FIG. 5 is a schematic view of a possible protocol multiplexing system.

FIG. 5 illustrates how state of the art timer mechanisms for protocol multiplexing are problematic (at least from a delay perspective) when multiplexing with a larger than conventional number of connections (e.g., CIDs). The multiplexing protocol system of FIG. 5 outputs ATM cells onto a virtual path VP 500. The ATM VP has a capacity of $C^{VP}$ (cells/sec). In FIG. 5, k number of AAL2 level queues 502 are provided, e.g., queue 502, through queue $502_k$. Queue $502_1$ is an AAL2 level queue for VC(1); queue $502_2$ is an AAL2 level queue for VC 2; and so forth up to queue $502_k$ which is an AAL2 level queue for VC(k). Upon arrival at a node having the multiplexing system, the packets from connections $conn_1$ through $conn_{248}$ for VC(1) (having respective connection identifiers $CID_1$ through $CID_{248}$) are stored in queue $502_1$; the packets from connections $conn_1$ through $conn_{248}$ for VC(k) (having respective connection identifiers $CID_1$ through $CID_{248}$) are stored in queue $502_k$; and so forth. The multiplexer $504_1$ multiplexes AAL2 packets stored in queue $502_1$ (for VC(1)) into an output buffer 506 for ATM VP 500 when an ATM cell for VC(1) is being assembled in output buffer 506. Likewise, multiplexer $504_k$ multiplexes AAL2 packets stored in queue $502_k$ (for VC(k)) into output buffer 506 for ATM VP 500 when an ATM cell for VC(k) is being assembled in output buffer 506. In the FIG. 5 system, each multiplexer 504 has an associated timer 508 (e.g., multiplexer $504_1$ has timer $508_1$; multiplexer $504_k$ has timer $508_k$; and so forth).

Thus, in the example scenario of FIG. 5, k number of VCs are multiplexed into a virtual path (VP 500) of capacity $C^{VP}$. In the particular example situation shown in the FIG. 5 scenario, a packet which would fill about 3.25 ATM cells arrived at multiplexer $504_1$. Since the packet can fully fill three ATM cells in output buffer 506, three ATM cells from multiplexer $504_1$ are stored in output buffer 506 as indicated by the dotted cells in FIG. 5. But since the packet arriving at multiplexer $504_1$ could only partially fill a fourth ATM cell, the remaining packet contents (e.g., the packet contents not corresponding to the three ATM cells stored in output buffer 506) are not yet stored in output buffer 506. Rather, according to the state of the art practice, timer 508$_1$ is started. While timer 508$_1$ is counting down, another packet arrives to multiplexer 504$_k$ (belonging to VC(k)). The packet which arrives at multiplexer 504$_k$ fully fills four ATM cells in output buffer 506, as indicated by the cross hatched cells in FIG. 5. When timer 508$_1$ subsequently expires, the last segment of the packet which previously arrived at multiplexer 504$_1$ is stored in a separate ATM cell in output buffer 506. The consequence of this is, that even if originally the dotted packet arrived earlier than the cross hatched packet, the dotted packet will be sent out from the multiplexing system later than the cross hatched packet. Thus, the first-in-first-out principle is violated.

In the example situation of FIG. 5, from the perspective of the output buffer 506 the last segment from multiplexer 504$_1$ was overtaken by four cells formed from the packet which arrived at multiplexer 504$_k$. Such a lag (of four ATM cells for VC(k)) between the fourth ATM cell associated with VC(1) and the earlier three ATM cells for VC(1) creates additional delay, because all four cells from multiplexer 504$_k$ must be served before the last segment of the packet applied to multiplexer 504$_1$ can be served.

What is needed therefore, and an object of the present invention, are techniques for better balancing delay and payload optimization in a packet multiplexing protocol system.

BRIEF SUMMARY

Example embodiments of protocol multiplexing systems comprise a multiplexer which receives multiplexed packet(s) and which uses contents of the multiplexed packets to form carrying packets which are stored in an output buffer. Some of the multiplexed packets belong to differing ones of plural virtual channels, but the multiplexer uses multiplexed packet(s) belonging to only one virtual channel to form a given carrying packet.

In a first example embodiment, if receipt by the multiplexer of a multiplexed packet belonging to any of the plural virtual channels would result in formation by the multiplexer of a partially-filled carrying packet, a common timer times a delay interval. Upon occurrence of a predetermined event, a determination is made if the partially-filled carrying packet should be stored in the output buffer in accordance with whether the timer is finished timing the delay interval. When the predetermined event is arrival of another multiplexed packet which belongs to a same virtual channel as the multiplexed packet that would result in formation of the partially-filled packet, the multiplexer also uses at least a portion of the another multiplexed packet to form the carrying packet if the timer is not finished timing the delay interval. When the predetermined event is arrival of another multiplexed packet which belongs to a different virtual channel than the multiplexed packet that would result in formation of the partially-filled packet, the multiplexer stores the partially-filled carrying packet in the output buffer if the timer is not finished timing the delay interval. When the predetermined event is the timer finishing timing the delay interval before arrival in the queue of another multiplexed packet, the multiplexer stores the partially-filled carrying packet in the output buffer.

In the first example embodiment, the queue which receives the multiplexed packets is a common queue, with some of the multiplexed packets which are received into the common queue belonging to differing ones of plural virtual channels. In addition, the queue stores a virtual channel identifier for each multiplexed packet. Each virtual channel accommodates plural connections.

In a second example embodiment protocol multiplexing system, for each of plural virtual channels there is a corresponding queue for receiving multiplexed packets belonging to the respective virtual channel. A common multiplexer uses the multiplexed packets obtained from the plural queues to form carrying packets. The formation of the carrying packets by the multiplexer is performed so that, for a remainder multiplexed packet, any remainder contents of the remainder multiplexed packet is not used to form a carrying packet which is stored in the output buffer until a remainder finalization triggering event. The remainder multiplexed packet is a multiplexed packet having remainder contents; the remainder contents being a portion of the remainder multiplexed packet which would not be utilized in filling of a whole number of carrying packet(s). The second embodiment protocol multiplexing system also has a data counter for each queue (e.g., for each virtual channel). For a specific virtual channel, the associated data counter counts how many carrying packets attributable to virtual channels other than that specific virtual channel are formed and loaded into the output buffer subsequent to the multiplexing of the multiplexed packet belonging to that specific virtual channel. The contents of the data counter are used to at least partially determine the remainder finalization triggering event. For example, the remainder finalization triggering event can be determined to be the contents of the first data counter reaching a predetermined finite number.

The second embodiment protocol multiplexing system can also comprise a timer for each input queue (e.g., a first timer which, upon multiplexing of the remainder multiplexed packet belonging to a first virtual channel, times a first virtual channel delay interval). Thereby a determination regarding the remainder finalization triggering event can also be made in accordance with whether the timer is finished timing the first virtual channel delay interval.

A third example embodiment protocol multiplexing system has a pointer associated with each input queue (e.g., each virtual channel). For example, a first pointer is provided which tracks a payload end location in the buffer occupied by a last-fed-to-buffer carrying packet belonging to a first virtual channel; a second pointer is provided which tracks a payload end location in the buffer occupied by a last-fed-to-buffer carrying packet belonging to a second virtual channel; and so forth. Using the pointers, the multiplexer can augment the last-fed-to-buffer carrying packet belonging to the first virtual channel, at the payload end location tracked by the first pointer, with at least partial contents of a next-received multiplexed packet belonging to the first virtual channel to the buffer, even when the second pointer succeeds the first pointer.

Aspects of the third example embodiment can be carried into other embodiments. For example, the pointers of third embodiment can be utilized in conjunction with the first embodiment wherein a common queue receives multiplexed packets (with some of the multiplexed packets belonging to differing ones of plural virtual channels including the first virtual channel and the second first virtual channel). In such implementation, a common timer is provided. If multiplexing of a multiplexed packet belonging to any of the plural virtual channels results in formation of a partially-filled carrying packet, the timer times a delay interval. As in the first embodiment, upon occurrence of a predetermined event, a determination is made if a partially-filled carrying packet should be stored in the output buffer in accordance with whether the timer is finished timing the delay interval.

The pointers of third embodiment can also be utilized in conjunction with the second embodiment, wherein plural input queues are associated with plural virtual channels and a common multiplexer feeds the output buffer. For a remainder multiplexed packet, any remainder contents of the remainder multiplexed packet is not used to form a carrying packet which is stored in the output buffer until a remainder finalization triggering event has occurred. The contents of a data counter can be utilized to at least partially determine the remainder finalization triggering event. The data counter counts how many carrying packets attributable to virtual channels other than a specific virtual channel are formed and load into the output buffer subsequent to the multiplexing of the multiplexed packet belonging to the specific virtual channel.

In the differing modes and embodiments of the invention, the carrying packet is preferably of a predetermined carrying packet size. Moreover, as an example, the multiplexed packet can be an AAL2 packet and the carrying packet can be an ATM cell.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures.

In the example embodiments of protocol multiplexing systems described herein, a multiplexer uses one or more multiplexed packets to form carrying packets which are stored in an output buffer. Under control of a packet server or the like, the carrying packets stored in the output buffer are transmitted, in accordance with the capacity of the packet server and timing considerations, e.g., link timing considerations, to a physical transmission path or link (which typically leads away from a node or the like at which the protocol multiplexing system is situated).

The multiplexed packets are higher layer packets which can be borne, either in whole or in part, in lower layer packets. As one illustrative example applicable to all embodiments described herein, the multiplexed packets can be AAL2 packets, and the carrying packets can be ATM cells. However, the present invention is not limited to these specific example packet types, as it should be understood that the invention encompasses multiplexer systems where fixed sized carrying packets are utilized, and certain multiplexer systems in which variable sized carrying packets are utilized.

Figure 1:
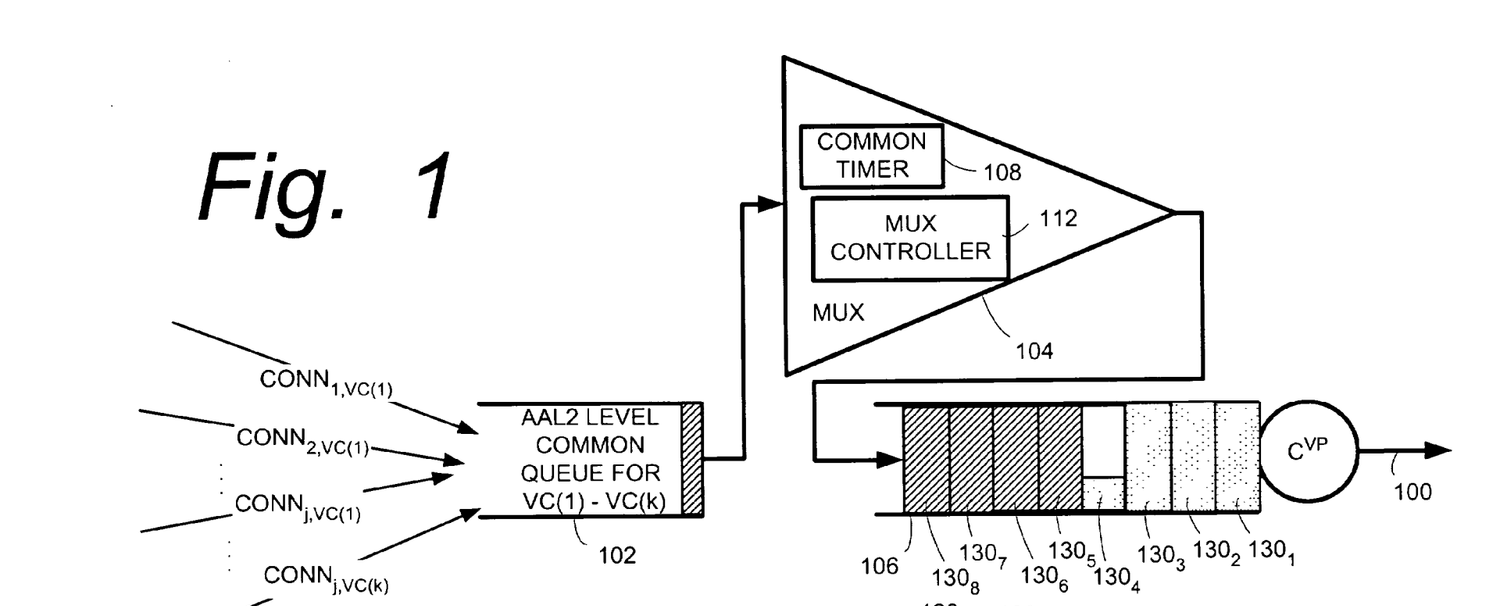
FIG. 1 is a schematic view of a first example embodiment protocol multiplexing system.

The protocol multiplexing system of FIG. 1 comprises a multiplexer 104 which obtains multiplexed packets from common queue 102, and which uses the multiplexed packets to form carrying packets which are stored in output buffer 106 prior to transmission of the carrying packets on transmission path 100. As shown in FIG. 1, the multiplexer 104 comprises, e.g., common timer 108 and multiplexer controller 112. As used herein, the multiplexer controller 112 essentially represents certain supervisory or control logic which governs operation of multiplexer 104, it being understood that a controller per se need not be employed. Moreover, there are various ways of implementing or distributing the functionalities of common timer 108 and multiplexer controller 112 within multiplexer 104, including the example depiction in FIG. 1 of these functionalities being separate units within 104. Alternatively, one or more of these functionalities may be included in other units of multiplexer 104 or the same unit, e.g., common timer 108 may be included in multiplexer controller 112.

As shown in FIG. 1, the common queue 102 receives multiplexed packets belonging to plural virtual channels. As with comparable queues shown in other embodiments, queue 102 is an AAL2 level common queue, which stores AAL2 CPS (Common Part Sublayer) packets. Each of the plural virtual channels in turn carries packets for plural connections. For example, FIG. 1 shows common queue 102 receiving multiplexed packets for each of k number of virtual channels, e.g., VC(1) through VC(k). Moreover, for each virtual channel the common queue 102 can receive multiplexed packets for as many as j number of connections. For AAL2, for example, j typically equals 248. Specifically, common queue 102 receives multiplexed packets for a first connection of VC(1), shown as $CONN_{1,VC(1)}$, a second connection of VC(1), shown as $CONN_{2,VC(1)}$, and so forth up to and including j number of connections for VC(1). Such may also be the case for all k number of VCs, culminating in a last connection of VC(k), shown as $CONN_{j,VC(k)}$.

Thus, some of the multiplexed packets arriving at common queue 102 belong to differing ones of plural virtual channels (e.g., VC(1)–VC(k)). However, multiplexer 104 feeds the buffer so that a given carrying packet comprises multiplexed packets belonging to only one virtual channel. In other words, all multiplexed packets forming an given carrying packet belong to the same virtual channel.

The common timer 108 of multiplexer 104 serves to time or monitor what is herein known as a delay interval. As mentioned above, the common timer 108 may be distinct from multiplexer controller 112 as shown in FIG. 1, or may actually comprise multiplexer controller 112, or may be provided or situated in various other manners.

The multiplexer 104 uses the contents of multiplexed packets stored in common queue 102 to form carrying packets which are subsequently stored in output buffer 106. In the example embodiment of FIG. 1, if utilization of a multiplexed packet (stored in common queue 102 and belonging to any of the plural virtual channels) would result in formation of a partially-filled carrying packet, the multiplexer 104, e.g., multiplexer controller 112, initiates the timing of a delay interval. The timing of the delay interval is timed or monitored by common timer 108, which can be a count-down timer, for example. Upon occurrence of a predetermined event, multiplexer controller 112 determines if the partially-filled carrying packet being formed by the multiplexer should be finalized and stored in output buffer 106. In making such determination, the multiplexer controller 112 may check whether common timer 108 is finished timing the delay interval. The delay interval can be a predetermined value which is set according operating circumstances. A non-limiting, example predetermined value for the delay interval can be about one millisecond, for example. As a first example scenario for the first embodiment, assume that the common timer 108 has been started because, using a multiplexed packet from virtual channel VC(x), the multiplexer 104 is in the process of forming a partially-filled carrying packet. If another multiplexed packet which belongs to the same virtual channel VC(x) subsequently arrives in common queue 102, the multiplexer controller 112 allows the multiplexer 104 also to include at least a portion of the subsequently arriving multiplexed packet in the carrying packet being formed, provided that common timer 108 is not finished timing the delay interval. Such utilization results in further filling, perhaps even total filling, of the carrying packet currently being formed by multiplexer 104 and which previously had been considered (and may still be) as only partially filled.

As a second example scenario for the first embodiment, assume that the common timer 108 has similarly been started after initial formation by multiplexer 104 of a partially-filled packet formed using a multiplexed packet from virtual channel VC(x). If another multiplexed packet which belongs to another virtual channel VC ($\neq$x) subsequently arrives in common queue 102, multiplexer controller 112 allows (actually requires) that the partially-filled packet being formed by multiplexer 104 be stored in buffer 106 if common timer 108 is not finished timing the delay interval. Thus, this second example scenario results in completion/finalization and storage of the carrying packet by the multiplexer 104.

As a third example scenario for the first embodiment, if the multiplexer 104 has finished timing the delay interval before arrival in the queue of another multiplexed packet, the multiplexer controller 112 allows (or requires) that the partially-filled packet being formed by multiplexer 104 be finalized and stored in buffer 106 as a result of expiration of the delay interval.

Figure 1A:
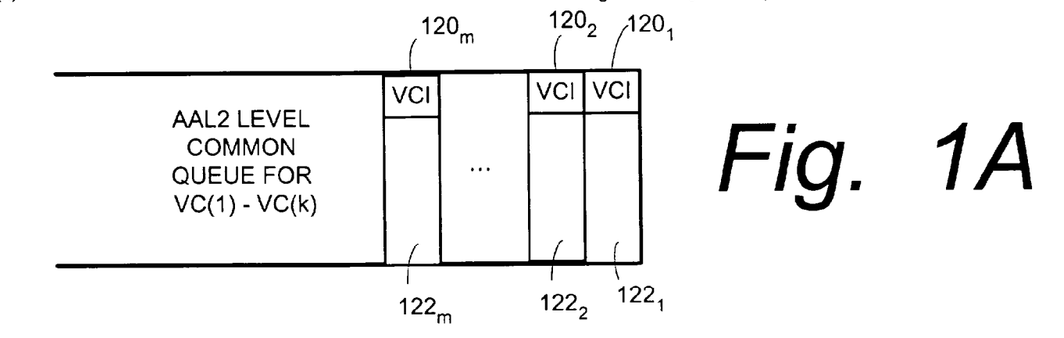
FIG. 1A is a schematic view of a common queue for the first example embodiment protocol multiplexing system of FIG. 1.

To facilitate operation of the first example embodiment of FIG. 1, an indicator such as a virtual channel identifier (VCI) is stored with or associated with each multiplexed packet received in common queue 102. The indicator (e.g., virtual channel identifier (VCI)) can either be stored in common queue 102 as a header or the like for the received multiplexed packet, or stored in a table and correlated with the location of an entering multiplexed packet. Such table can be maintained, e.g., by a controller which interacts both with common queue 102 and multiplexer 104. FIG. 1A particularly shows the situation in which common queue 102 stores virtual channel identifiers (VCIs), depicted as VCI, as headers $120_1$, $120_2$, etc, of respective multiplexed packets $122_1$, $122_2$, etc., stored in common queue 102.

It should be understood that the indicator utilized for the multiplexed packets stored in common queue 102 can have other names, e.g., multiplexer ID, but in some sense is related to (e.g., the same as or derived from) the virtual channel to which the multiplexed packets belongs, hence use herein of the generic term virtual channel identifier.

The particular packet production pattern shown in FIG. 1 resembles that of FIG. 4, but with the principles of the protocol multiplexing system of FIG. 1 instead being operative. For example, assume that a multiplexed packet for VC(1) has arrived at common queue 102, and would fill three full carrying packets in buffer 106, and still have contents left over for forming a portion (but not all) of a fourth carrying packet. FIG. 1 shows that, in accordance with all three scenarios of the first embodiment as described above, the multiplexer 104 has used the contents of the arriving multiplexed packet to form three full carrying packets $130_1$–$130_3$, as well as a partially-filled carrying packet $130_4$. These four carrying packets, all comprised of the multiplexed packet belonging to VC(1), are depicted by dotted fill packets in FIG. 1 to reflect association with VC(1).

In the operation that resulted in the packet formation pattern of FIG. 1, upon receipt of the multiplexed packet for VC(1), multiplexer 104 formed and stored in output buffer the three full carrying packets $130_1$–$130_3$. Further, upon noting that a partially-filled carrying packet might result from the rest of the contents of the multiplexed packet for VC(1), multiplexer controller 112 required common timer 108 to start timing its delay interval. If, prior to the expiration of the delay interval, another multiplexed packet arrives in common queue 102, the multiplexer controller 112 would discern from the VCI or multiplexer ID stored or associated with the more recently received multiplexed packet whether the more recently received multiplexed packet belongs to the same virtual channel as does the multiplexed packet for which the common timer 108 has been activated. If not, and having noted that the common timer 108 has not yet expired, the multiplexer controller 112 finalizes and stores the partially-filled carrying packet $130_4$ in output buffer 106, in the manner illustrated. As also shown in FIG. 1, the more recently received multiplexed packet has been used by multiplexer 104 to form four carrying packets $130_5$–$103_8$ (depicted by cross hatched fill in FIG. 1).

The first example embodiment of FIG. 1 therefore does not allow the situation of FIG. 5. While partially-filled carrying packets do exist in the first example embodiment of FIG. 1, the timer mechanism implemented by common timer 108 does not hurt the timing of the FIFO scheduling (e.g., the timing of the scheduling for buffer 106, which involves first-in-first-out packet handling without one packet overtaking another packet).

Figure 2:
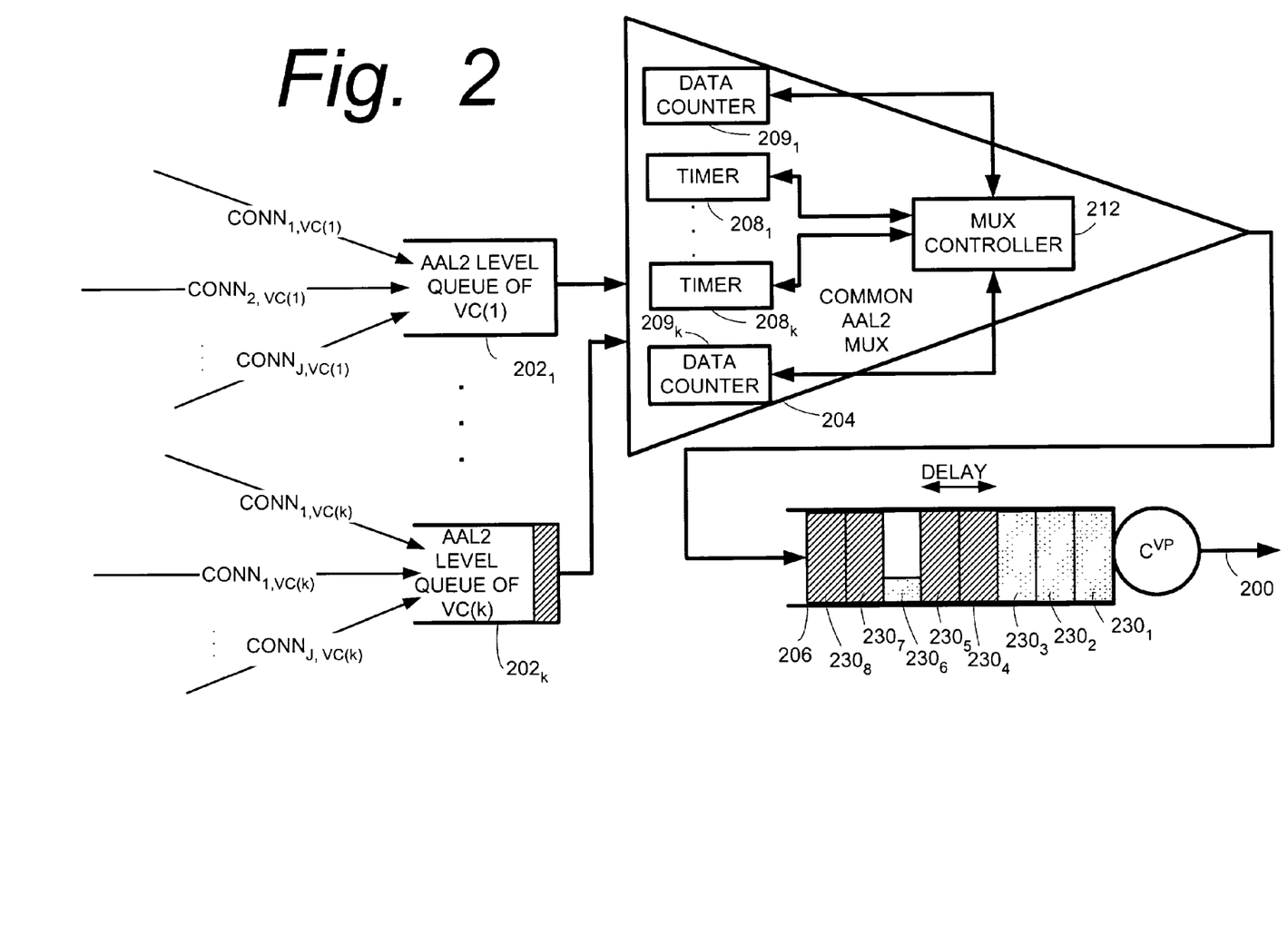
FIG. 2 is a schematic view of a second example embodiment protocol multiplexing system.

The second example embodiment protocol multiplexing system of FIG. 2 is characterized, e.g., in having, for each virtual channel, a corresponding queue 202. The queues 202 receive multiplexed packets belonging to their corresponding virtual channel (e.g., a first queue $202_1$, which receives multiplexed packets belonging to a first virtual channel VC(1); up to and including a last queue $202_k$ which receives multiplexed packets belonging to a last virtual channel VC(k)).

A common multiplexer 204 uses the multiplexed packets obtained from the plural queues 202 to form carrying packets which are eventually stored in output buffer 206. In the FIG. 2 embodiment, when a queue 202 receives a multiplexed packet, the common multiplexer 204 initially forms and stores in output buffer 206 carrying packets corresponding only to as much of the contents of the multiplexed packet as will fill a whole number of carrying packets. Any remaining content portion of the arriving multiplexed packet which will not fill a full carrying packet, known herein as "remainder contents" of a "remainder multiplexed packet", is retained for another carrying packet for that virtual channel. That "another" carrying packet (which has not necessarily been completed) is accordingly not yet stored in output buffer 206. Rather, the carrying packet containing the remainder contents is completed and stored at a subsequent time, e.g., upon occurrence of a remainder finalization triggering event.

Thus, as used herein, a "remainder multiplexed packet" is a multiplexed packet having "remainder contents". The remainder contents is a portion of the remainder multiplexed packet which would not be utilized in filling of a whole number of carrying packet(s).

The second embodiment multiplexer 204 of FIG. 2 comprises multiplexer controller 212, as well as a data counter 209 associated with each corresponding queue 202 (e.g., for each virtual channel). For example, queue $202_1$ has corresponding data counter $209_1$; queue $202_k$ corresponding has data counter $209_k$, and so forth. For a specific virtual channel, e.g., for a specific queue 202, the associated data counter 209 counts how much payload (e.g., how may carrying packets) attributable to virtual channels other than that specific virtual channel is loaded into the buffer 206 subsequent to the multiplexing of a remainder multiplexed packet belonging to that specific virtual channel. Each of the data counters is incremented when the common multiplexer 204 is ready to store a new carrying packet in buffer 206.

As with the embodiment of FIG. 1, the elements and functionalities of common multiplexer 204 may be distributed and packaged in various ways. The separate units shown in FIG. 1 are merely for sake of illustrating functionalities performed by common multiplexer 204.

The multiplexer controller 212 of the FIG. 2 protocol multiplexing system uses the contents of a data counter 209 to determine at least partially the remainder finalization triggering event. For example, for remainder multiplexed packet for virtual channel VC(1), the controller 212 can determine the remainder finalization triggering event as having occurred when the contents of the first data counter 209, reaches a predetermined finite number. Optionally, the second embodiment protocol multiplexing system of FIG. 2 can also involve common multiplexer 204 as comprising a timer 208 for each corresponding input queue 202. For example, first input queue $202_1$ has a first timer $208_1$ which, upon multiplexing of the remainder multiplexed packet belonging to a first virtual channel, times a first virtual channel delay interval in similar manner as previously described. As described below, the timers 208 can also be utilized by controller 212 in determining the remainder finalization triggering event (e.g., whether the timer 208 is finished timing the first virtual channel delay interval can be a factor in determining the occurrence of the remainder finalization triggering event).

One or more of the timers 208 and data counters 209 may be included in or encompassed by multiplexer controller 212. Alternatively, the timers 208 and data counters 209 may be distinct components as depicted in FIG. 2.

Thus, in the FIG. 2 protocol multiplexing system, a partially filled carrying packet is finalized and stored in buffer 206 whenever the data counter 209 for its associated virtual channel becomes higher than a predefined limit. In this manner, a trade off or balance between delay and payload optimization can be tuned.

In the particular packet illustration shown in FIG. 2, a remainder finalization triggering event occurs when the data counter associated with a remainder multiplexed packet reaches two carrying packets (e.g., two ATM cells in an implementation wherein the carrying packets are ATM cells). In the FIG. 2 illustration, a first multiplexed packet belonging to VC(1) arrives in queue $202_1$ and gets segmented into four parts. The first three parts fill three carrying packets, e.g., carrying packets $230_1$ through $230_3$ in FIG. 3 (depicted as dotted filled packets). FIG. 3 shows these three carrying packets $230_1$ through $230_3$ as already having been stored in output buffer 206. In view of the fact that fourth part of the multiplexed packet remains and cannot itself fill a carrying packet, it is considered as remainder contents of the multiplexed packet and is retained in an interim (not necessarily completed) carrying packet rather than used to form a finalized carrying packet. Rather, the timer $208_1$ for the associated queue 202, (e.g., the timer 208 for the VC to which the remainder multiplexed packets belongs) is commissioned by controller 212 to begin timing the delay interval, and similarly the data counter $209_1$ for the associated queue $202_1$ is re-initialized.

Assume, in the foregoing illustration, that while the timer $208_1$ is counting down, another multiplexed packet arrives in the another queue 202, e.g., another multiplexed packet arrives in queue $202_k$. Assume further that this multiplexed packet which just arrived in queue $202_k$ could fully fill four carrying packets. In such case, the common multiplexer 204 beings to form carrying packets belonging to VC(k). But after forming these carrying packets and storing two such carrying packets in buffer 206 (shown as cross-hatch filled carrying packets $230_4$ and $230_5$ in FIG. 2), the value of data counter $209_1$ reaches two, which is the predefined limit. At this point, the controller 212 declares a remainder finalization triggering event for the partially-filled carrying packet for VC(1) which was withheld by common multiplexer system 204. Upon declaration of the remainder finalization triggering event, the common multiplexer system 204 finalizes the partially-filled carrying packet for VC(1), comprising the fourth part of the multiplexed packet which arrived in queue $202_1$, and stores the carrying packet $230_6$ in the output buffer 206 in the manner shown in FIG. 2. The remaining two carrying packets $230_7$ and $230_8$ for VC(k) can then be stored by common multiplexer 204 into buffer 206, as also shown in FIG. 2.

Hence, in the FIG. 2 embodiment, the data counters 209 facilitate a limit on the number of overtaking carrying packets in buffer 206, e.g., a limit on the delay between carrying packets of the same virtual channel. In the FIG. 2 embodiment the data limit for the data counters 209 is finite. When the data limit is zero, the protocol multiplexing system of FIG. 2 performs similarly to that of FIG. 1.

Figure 3A:
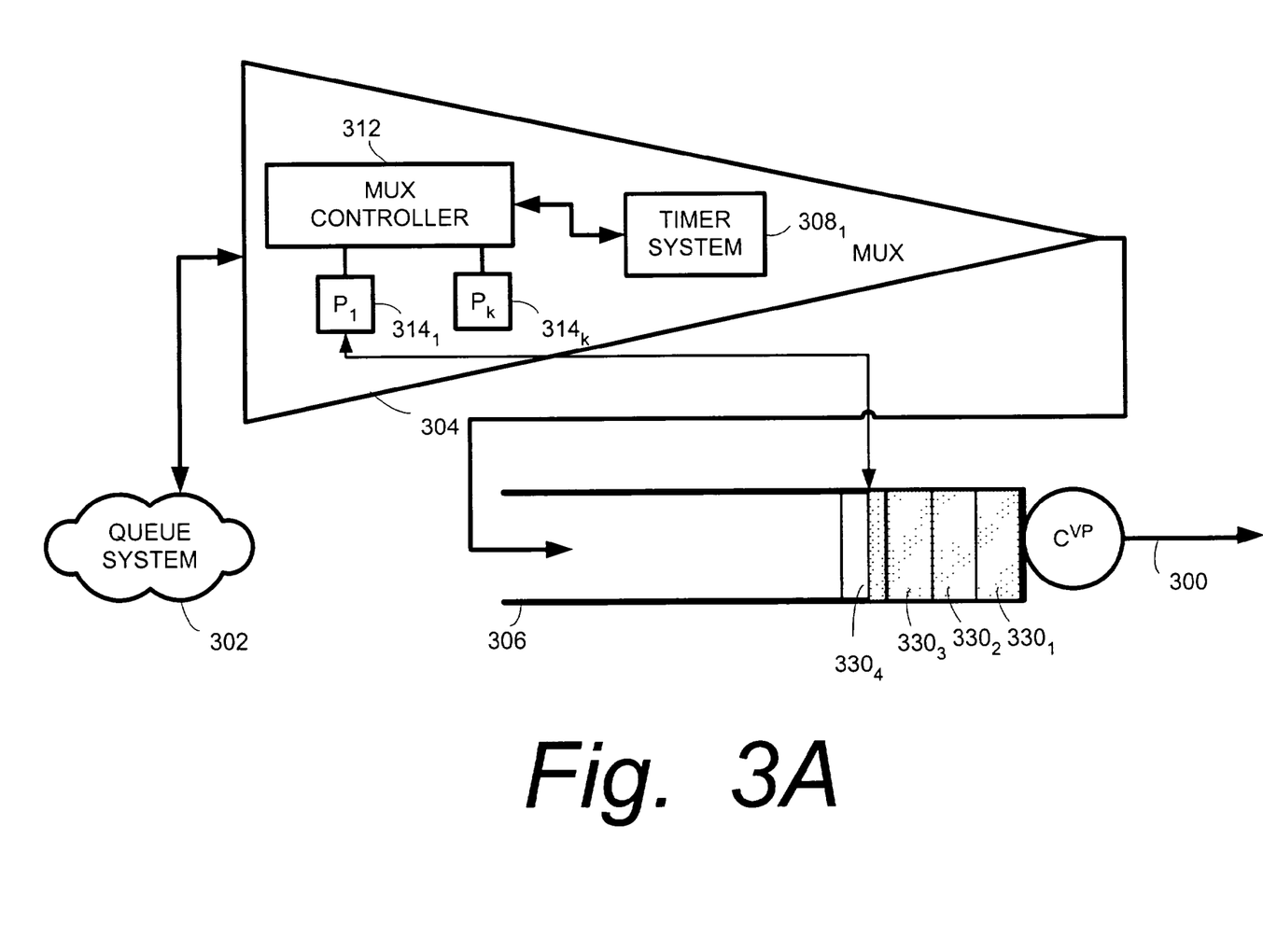
FIG. 3A, FIG. 3B, and FIG. 3C are schematic views of portions of a third example embodiment protocol multiplexing system, showing successive stages of operation for an example mode.

FIG. 3A illustrates certain portions of a third example embodiment protocol multiplexing system. The FIG. 3A system can be employed in context of any of the previously described systems and other system, including but not limited to the systems of FIG. 1, FIG. 2, FIG. 4, and FIG. 5. Therefore, only portions of the FIG. 3A system specific thereto are described herein, it being understood that other components or aspects of the system can be acquired from the overall context system in which it is employed. To this end, in FIG. 3A the reference numeral 302 represents a queuing system which can either be a common queue as in the manner of queue 102 of FIG. 1, or a series of VC-specific queues such as queues 202 of FIG. 2. Moreover, the multiplexer 304 includes a timer system generically shown as timer system 308 in FIG. 3A. The generic timer system 308 can comprise a common timer such as common timer 108 of the FIG. 1 embodiment, or a set of VC-specific timers such as timers 208 of the FIG. 2 embodiment.

In the example embodiment protocol multiplexing system of FIG. 3A, the multiplexer controller 312 accesses buffer 306 to provide a buffer pointer associated with each virtual channel (e.g., each input queue). For example, a first pointer tracks a payload end location in the buffer 306 occupied by a last-fed-to-buffer carrying packet belonging to a first virtual channel; a second pointer tracks a payload end location in the buffer occupied by a last-fed-to-buffer carrying packet belonging to a second virtual channel; and so forth up to a $k^{th}$ pointer for the $k^{th}$ virtual channel.

The pointers are maintained in a memory, such as pointer memories $314_1$ through $314_k$ as shown in FIG. 3A. The pointer memories $314_1$ through $314_k$ can be one or more discrete or separate memory units (e.g., RAMs) as shown in FIG. 3A, or can comprise multiplexer controller 312, or be realized in any other of several conventional memory allocation techniques. Rather than the pointer memories and/or timer system 308 being discrete units, some or all may be included in multiplexer controller 312.

Figure 3B:
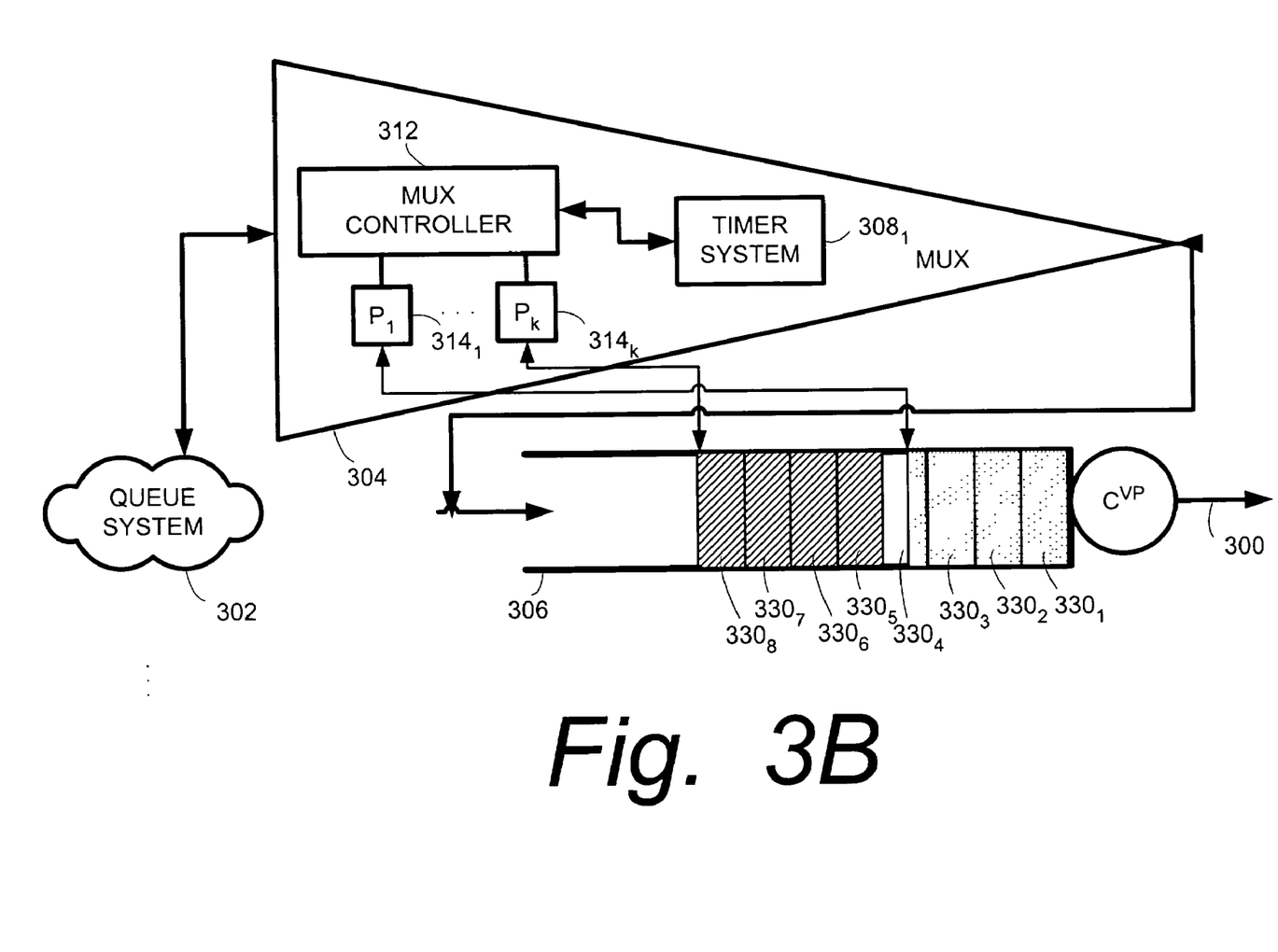
Figure 3C:
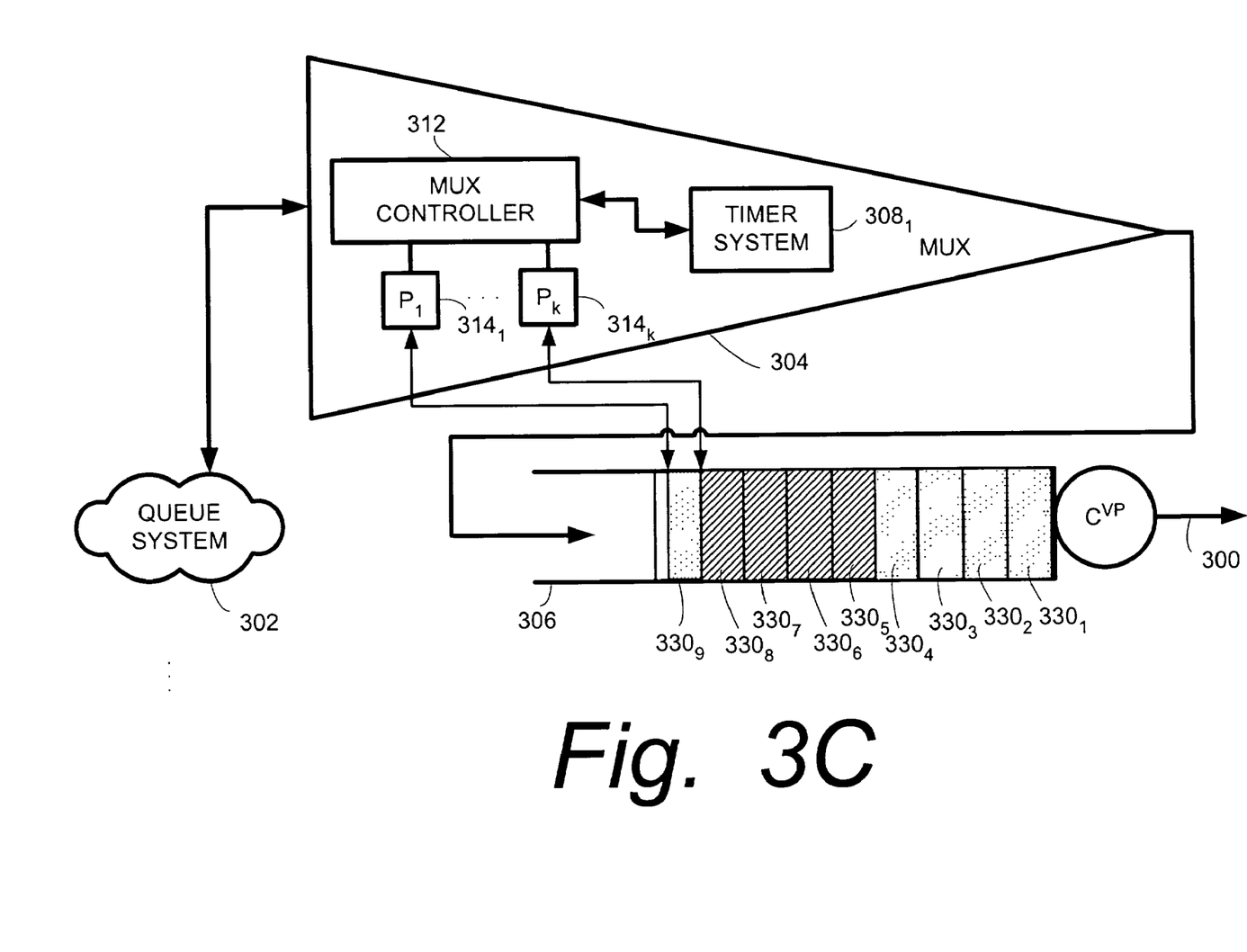

As illustrated in an example scenario shown in successive stages in FIG. 3A through FIG. 3C, using the pointers the controller 312 can allow the multiplexer 304 to feed to the output buffer 306 at least partial contents of a next-received multiplexed packet belonging to the first virtual channel to the buffer, even when the second pointer succeeds the first pointer. In this scenario, if a partially-filed carrying packet is put into the buffer 306, then its (payload end) position in buffer 306 is stored in the associated pointer for VC to which the carrying packet belongs. Thus, each pointer 314 is assigned to a different lower level identifier (e.g., virtual channel). When a carrying packet leaves the lower level queue (e.g., buffer 306), its referring pointer must be cleared. If a new multiplexed packet arrives into the multiplexer and there is a pre-existing buffer pointer for the virtual channel to which the arriving packet belongs which points to a partially-filled carrying packet, then the multiplexer first fills (e.g., augments or modifies) the carrying packet already in the buffer 306 at the position pointed to by the corresponding buffer pointer. In so doing, the multiplexer 304 puts the contents of the newly arrived multiplexed packet at the location pointed to by the corresponding buffer pointer, and updates the buffer pointer accordingly.

The example scenario of FIG. 3A–FIG. 3C is similar to that of FIG. 1, but instead employs the techniques of the third embodiment with its buffer pointers. Again assume, for example, a multiplexed packet for VC(1) has arrived in queuing system 302, and that the contents of the arriving multiplexed packet would fill three full carrying packets in buffer 306, and still have contents left over for forming a portion (but not all) of a fourth carrying packet. Accordingly, as shown in FIG. 3A, the multiplexer 304 uses the contents of the arriving multiplexed packet to form three full carrying packets $330_1$–$330_3$ in output buffer 306, as well as a partially-filled carrying packet $330_4$. These four carrying packets, all comprised of the multiplexed packet belonging to VC(1), are depicted by dotted fill packets in FIG. 3A to reflect association with VC(1). The multiplexer controller 312 stores in buffer pointer memory $314_1$ the payload end address in buffer 306 of the partially-filled carrying packet $330_4$, i.e., the last carrying packet for virtual channel VC(1) in buffer 306. Such storage is performed essentially immediately in an implementation in which timers are employed, and if the timer for virtual channel VC(1) has a zero value.

Assume further the situation shown in FIG. 3B, e.g., that another multiplexed packet arrives in queuing system 302, and that the arriving multiplexed packet belongs to virtual channel VC(k). As shown in FIG. 3B, multiplexer 304 uses the arriving packet for virtual channel VC(k) to fill four carrying packets, i.e., carrying packets $330_5$ through $330_8$ (depicted by cross hatched fill in FIG. 3B).

Assume still further that another multiplexed packet arrives for virtual channel VC(1). At this time the pointer $314_1$ points to a (payload end) address in buffer 306 for carrying packet $330_4$, which is only partially filled. The multiplexer 304 first fills the partially-filled carrying packet (e.g., packet $330_4$) with the contents of the just-arrived multiplexed packet for virtual channel VC(1). If there are any remainder contents for the just-arrived multiplexed packet for virtual channel VC(1), the multiplexer system 304 puts such remainder contents in a new cell (e.g., new carrying packet $330_9$) at the end of buffer 306. The multiplexer controller 312 then updates the value of the buffer pointer $314_1$ accordingly to point to the end of the contents of the new carrying packet (e.g., carrying packet $330_9$), as shown in FIG. 3C.

The third embodiment thus differs from the first and second embodiments in that the third embodiment does not handle the multiplexed packet level (the AAL2 level) and the carrying packet level (the ATM level) independently. In a sense, in the third embodiment AAL2 some multiplexing is performed (when needed) within the output buffer 306. Such may be appropriate or convenient in instances in which both the AAL2-level infrastructure and the ATM level infrastructure are owned by the network operator, thereby catering to an possible node-internal solution.

Aspects of the third example embodiment can be carried into other embodiments. For example, the pointers of third embodiment can be utilized in the first embodiment wherein a common queue receives multiplexed packets (with some of the multiplexed packets belonging to differing ones of plural virtual channels including the first virtual channel and the second first virtual channel). In such implementation, a common timer is provided. If multiplexing of a multiplexed packet belonging to any of the plural virtual channels results in formation of a partially-filled carrying packet, the timer times a delay interval. As in the first embodiment, upon occurrence of a predetermined event, a controller determines if a partially-filled carrying packet should be stored in the buffer in accordance with whether the timer is finished timing the delay interval.

For example, the pointers of third embodiment can be utilized in the first embodiment having plural input queues associated with plural virtual channels and a common multiplexer which feeds the output buffer. The common multiplexer forms the carrying packets in a manner so that, for a remainder multiplexed packet, any remainder contents of the remainder multiplexed packet is not is not considered part of a finalized carrying packet until a remainder finalization triggering event. As in the second example embodiment, the contents of a data counter can be utilized to at least partially determine the remainder finalization triggering event. The data counter counts how may carrying packets attributable to virtual channels other than a specific virtual channel are formed and loaded into the buffer subsequent to the multiplexing of the multiplexed packet belonging to the specific virtual channel.

In the differing modes and embodiments of the invention, the carrying packet is preferably of a predetermined carrying packet size. Moreover, as an example, the multiplexed packet can be an AAL2 packet and the carrying packet can be an ATM cell.

Those skilled in the art will appreciate that the functions of various components and functionalities herein described, including but not limited to the multiplexer controllers, may be implemented using individual hardware circuits, using software functioning in conjunction with a suitably programmed digital microprocessor or general purpose computer, using an application specific integrated circuit (ASIC), and/or using one or more digital signal processors (DSPs).

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A protocol multiplexer which receives multiplexed packets and which uses the multiplexed packets to form carrying packets which are stored in an output buffer, the multiplexer receiving the multiplexed packets belonging to differing ones of plural virtual channels but forming a given carrying packet to comprise one or more multiplexed packet(s) belonging to only one virtual channel, the multiplexer comprising
a common timer which times a delay interval if receipt of a multiplexed packet belonging to any of the plural virtual channels would result in the carrying packet being formed as a partially-filled carrying packet, the common timer initiating timing of the delay interval regardless from which of the plural virtual channels the multiplexing packet which would result in the carrying packet being formed as a partially-filled carrying packet is received;
a multiplexer controller which, upon occurrence of a predetermined event, determines if the partially-filled carrying packet should be stored in the output buffer in accordance with whether the timer is finished timing the delay interval.

2. The apparatus of claim 1, wherein when the predetermined event is arrival of another multiplexed packet, the another multiplexed packet belonging to a same virtual channel as the multiplexed packet that would result in formation of the partially-filled carrying packet, the multiplexer includes at least a portion of contents of the another multiplexed packet in the carrying packet being formed if the timer is not finished timing the delay interval.

3. The apparatus of claim 1, wherein when the predetermined event is arrival of another multiplexed packet, the another multiplexed packet belonging to a different virtual channel than the multiplexed packet that would result in storage in the buffer of the partially-filled packet, the multiplexer stores the partially-filled carrying packet in the output buffer if the timer is not finished timing the delay interval.

4. The apparatus of claim 1, wherein when the predetermined event is the timer finishing timing the delay interval before arrival in the queue of another multiplexed packet, the multiplexer stores the partially-filled carrying packet in the output buffer.

5. The apparatus of claim 1, wherein the carrying packet is of a predetermined carrying packet size.

6. The apparatus of claim 1, wherein the multiplexed packet is an AAL2 packet and the carrying packet is an ATM cell.

7. The apparatus of claim 1, further comprising a common queue which receives the multiplexed packets, with some of the multiplexed packets belonging to differing ones of plural virtual channels, and wherein the multiplexer uses contents of the multiplexed packets obtained from the common queue to form the carrying packet.

8. The apparatus of claim 7, wherein the queue stores a virtual channel identifier for each multiplexed packet.

9. The apparatus of claim 8, wherein each virtual channel accommodates plural connections.

10. A protocol multiplexing system comprising:
a queue which receives multiplexed packet(s), with some of the multiplexed packet(s) belonging to differing ones of plural virtual channels;
a multiplexer which forms carrying packets using the multiplexed packet(s) obtained from the queue, the multiplexer comprising:
a timer which times a delay interval if multiplexing of a first multiplexed packet of a first virtual channel results in formation of a partially-filled carrying packet; and
wherein if a multiplexed packet of a second virtual channel arrives at the queue before the timer is finished timing the first virtual channel delay, the partially-filled carrying packet for the first virtual channel is stored in an output buffer.

11. The apparatus of claim 10, wherein the carrying packet is of a predetermined carrying packet size.

12. The apparatus of claim 10, wherein the queue stores a virtual channel identifier for each multiplexed packet.

13. The apparatus of claim 12, wherein each virtual channel accommodates plural connections.

14. The apparatus of claim 10, wherein the multiplexed packet is an AAL2 packet and the carrying packet is an ATM cell.

15. A protocol multiplexing system comprising:
a queue which receives multiplexed packet(s), with some of the multiplexed packet(s) belonging to differing ones of plural virtual channels;
a multiplexer which uses the multiplexed packet(s) obtained from the queue to form carrying packets, the multiplexer comprising:
a timer which times a delay interval if multiplexing of a first multiplexed packet of a first virtual channel results in formation of a partially-filled carrying packet;
wherein if a second multiplexed packet of the first virtual channel arrives at the queue before the timer is finished timing the delay interval, at least a portion of the second multiplexed packet of the first virtual channel is used to form the carrying packet;
wherein if no further multiplexed packet of the first virtual channel arrives at the queue before the timer is finished timing the delay interval, the partially-filled carrying packet for the first virtual channel is stored in an output buffer;
wherein if a multiplexed packet of a second virtual channel arrives at the queue before the timer is finished timing the delay interval, the partially-filled carrying packet for the first virtual channel is stored in the output buffer.

16. The apparatus of claim 15, wherein the carrying packet is of a predetermined carrying packet size.

17. The apparatus of claim 15, wherein the queue stores a virtual channel identifier for each multiplexed packet.

18. The apparatus of claim 17, wherein each virtual channel accommodates plural connections.

19. The apparatus of claim 15, wherein the multiplexed packet is an AAL2 packet and the carrying packet is an ATM cell.

20. A protocol multiplexing system comprising:
   a first queue which receives multiplexed packet(s) belonging to a first virtual channel;
   a second queue which receives multiplexed packet(s) belonging to a second virtual channel;
   a common multiplexer which uses the multiplexed packet(s) obtained from the first queue and the second queue to form carrying packets in a manner so that (1) a given carrying packet comprises multiplexed packet(s) belonging to only one virtual channel; and (2) for a remainder multiplexed packet, any remainder contents of the remainder multiplexed packet is not used to form a carrying packet which is stored in an output buffer until a remainder finalization triggering event, the remainder multiplexed packet being a multiplexed packet having remainder contents, the remainder contents being a portion of the remainder multiplexed packet which would not be utilized in filling of a whole number of carrying packet(s), wherein the multiplexer comprises:
      a first data counter which counts how may carrying packets attributable to virtual channels other than the first virtual channel are formed and loaded into the output buffer subsequent to the multiplexing of the multiplexed packet belonging to the first virtual channel;
      a multiplexer controller which uses contents of the first data counter to at least partially determine the remainder finalization triggering event.

21. The apparatus of claim 20, wherein the multiplexer controller determines the remainder finalization triggering event when the contents of the first data counter reaches a predetermined finite number.

22. The apparatus of claim 20, wherein upon determining the remainder finalization triggering event the multiplexer controller also allows a partially-filled carrying packet which bears the remainder contents obtained from the remainder multiplexed packet to be stored in the output buffer.

23. The apparatus of claim 20, wherein the multiplexer further comprises:
   a first timer which, upon multiplexing of the remainder multiplexed packet belonging to the first virtual channel, times a first virtual channel delay interval;
   wherein the multiplexer controller also determines the remainder finalization triggering event in accordance with whether the timer is finished timing the first virtual channel delay interval.

24. The apparatus of claim 20, wherein the multiplexer further comprises:
   a first timer which, upon multiplexing of the remainder multiplexed packet belonging to the first virtual channel, times a first virtual channel delay interval;
   wherein, if the contents of the first data counter has not reached a first virtual channel delay limit, the multiplexer controller also determines the remainder finalization triggering event in accordance with whether the timer is finished timing the first virtual channel delay interval.

25. The apparatus of claim 20, wherein the multiplexer further comprises:
   a second timer which, upon multiplexing of a remainder multiplexed packet belonging to the second virtual channel, times a second virtual channel delay interval;
   a second data counter which counts how many carrying packets attributable to virtual channels other than the second virtual channel is loaded into the buffer subsequent to the multiplexing of the multiplexed packet belonging to the second virtual channel;
   wherein the controller uses contents of the second data counter to at least partially determine a remainder finalization triggering event for the second virtual channel.

26. The apparatus of claim 20, wherein the carrying packet is of a predetermined carrying packet size.

27. The apparatus of claim 20, wherein the multiplexed packet is an AAL2 packet and the carrying packet is an ATM cell.

28. A protocol multiplexing system comprising: an output buffer in which carrying packets are stored;
   multiplexer which uses multiplexed packet(s) to form the carrying packets so that a given carrying packet comprises multiplexed packet(s) belonging to only one virtual channel, the multiplexer comprising
      a first pointer which tracks a payload end location in the output buffer occupied by a last-fed-to-buffer carrying packet belonging to a first virtual channel;
      a second pointer which tracks a payload end location in the output buffer occupied by a last-fed-to-buffer carrying packet belonging to a second virtual channel;
      a multiplexer controller which augments the last-fed-to-buffer carrying packet belonging to the first virtual channel, at the location tracked by the first pointer, with contents of a next-received multiplexed packet belonging to the first virtual channel.

29. The apparatus of claim 28, wherein the carrying packet is of a predetermined carrying packet size.

30. The apparatus of claim 28, wherein the multiplexed packet is an AAL2 packet and the carrying packet is an ATM cell.

31. The apparatus of claim 28, further comprising:
   a common queue which receives multiplexed packets, with some of the multiplexed packets belonging to differing ones of plural virtual channels including the first virtual channel and the second first virtual channel;
   a common timer which, if multiplexing of a multiplexed packet belonging to any of the plural virtual channels would result in formation of a partially-filled carrying packet, times a delay interval;
   wherein the multiplexer controller, upon occurrence of a predetermined event, determines if a partially-filled carrying packet should stored in the output buffer in accordance with whether the timer is finished timing the delay interval.

32. The apparatus of claim 31, wherein when the predetermined event is arrival in the queue of another multiplexed packet, the another multiplexed packet belonging to a same virtual channel as the multiplexed packet that resulted in formation in the buffer of the partially-filled packet, the multiplexer includes at least a portion of the another multiplexed packet in the carrying packet being formed if the timer is not finished timing the delay interval.

33. The apparatus of claim 31, wherein when the predetermined event is arrival in the queue of another multiplexed packet, the another multiplexed packet belonging to a different virtual channel than the multiplexed packet that would result in formation in the buffer of the partially-filled packet, the multiplexer stores the partially-filled packet in the buffer if the timer is not finished timing the delay interval.

34. The apparatus of claim 31, wherein when the predetermined event is the timer finishing timing the delay interval before arrival in the queue of another multiplexed packet, the multiplexer stores the partially-filled packet in the buffer.

35. The apparatus of claim 31, wherein the queue stores a virtual channel identifier for each multiplexed packet.

36. The apparatus of claim 35, wherein each virtual channel accommodates plural connections.

37. The apparatus of claim 28, further comprising:
a first queue which receives multiplexed packet(s) belonging to a first virtual channel;
a second queue which receives multiplexed packet(s) belonging to a second virtual channel;
wherein the multiplexer is a common multiplexer which uses the multiplexed packet(s) obtained from the first queue and the second queue to form carrying packets in a manner so that for a remainder multiplexed packet, any remainder contents of the remainder multiplexed packet is not used to form a carrying packet which are stored in the output buffer until a remainder finalization triggering event, the remainder multiplexed packet being a multiplexed packet having remainder contents, the remainder contents being a portion of the remainder multiplexed packet which would not be utilized in filling of a whole number of carrying packet(s);
wherein the multiplexer further comprises a first data counter which counts how may carrying packets attributable to virtual channels other than the first virtual channel are formed and loaded into the output buffer subsequent to the multiplexing of the multiplexed packet belonging to the first virtual channel;
wherein the multiplexer controller uses contents of the first data counter to at least partially determine the remainder finalization triggering event.

38. The apparatus of claim 37, wherein the multiplexer controller determines the remainder finalization triggering event when the contents of the first data counter reaches a predetermined finite number.

39. The apparatus of claim 37, wherein upon determining the remainder finalization triggering event the multiplexer controller also allows a partially-filled carrying packet which bears the remainder contents obtained from the remainder multiplexed packet to be stored in the output buffer.

40. A protocol multiplexing method comprising:
receiving multiplexed packets belonging to differing ones of plural virtual channels;
multiplexing the multiplexed packets into carrying packets, the multiplexing being performed so that a given carrying packet comprises multiplexed packet(s) belonging to only one virtual channel;
if multiplexing of a multiplexed packet belonging to any of the plural virtual channels would result in formation of a partially-filled carrying packet, using a timer to time a delay interval, the timer initiating timing of the delay interval regardless from which of the plural virtual channels the multiplexing packet which would result in formation of a partially-filled carrying packet is received;
upon occurrence of a predetermined event determining if the partially-filled carrying packet should be stored in an output buffer in accordance with whether the timer is finished timing the delay interval.

41. The method of claim 40, wherein when the predetermined event is arrival of another multiplexed packet, the another multiplexed packet belonging to a same virtual channel as the multiplexed packet that would result in formation of the partially-filled packet, the method further comprises including at least a portion of the another multiplexed packet in the carrying packet being formed if the timer is not finished timing the delay interval.

42. The method of claim 40, wherein when the predetermined event is arrival of another multiplexed packet, the another multiplexed packet belonging to a different virtual channel than the multiplexed packet that would result in formation of the partially-filled packet, the method further comprises including the partially-filled packet in the carrying packet being formed if the timer is not finished timing the delay interval.

43. The method of claim 40, wherein when the predetermined event is the timer finishing timing the delay interval before arrival in the queue of another multiplexed packet, the method further comprises storing the partially-filled packet in the output buffer.

44. The method of claim 40, wherein the carrying packet is of a predetermined carrying packet size.

45. The method of claim 40, wherein the multiplexed packet is an AAL2 packet and the carrying packet is an ATM cell.

46. The method of claim 40, further comprising:
receiving the multiplexed packets in a common queue, with some of the multiplexed packets belonging to differing ones of the plural virtual channels.

47. The method of claim 46, further comprising storing in the queue a virtual channel identifier for each multiplexed packet.

48. The method of claim 47, wherein each virtual channel accommodates plural connections.

49. A protocol multiplexing method comprising:
receiving multiplexed packets in a queue, with some of the multiplexed packets belonging to differing ones of plural virtual channels;
using the multiplexed packet(s) obtained from the queue to form carrying packets;
if receipt of a first multiplexed packet of a first virtual channel results in formation of a partially-filled carrying packet, using a timer to time a delay interval;
if a multiplexed packet of a second virtual channel arrives at the queue before the timer is finished timing the first virtual channel delay, storing the partially-filled carrying packet in an output buffer.

50. The method of claim 49, wherein the carrying packet is of a predetermined carrying packet size.

51. The method of claim 49, wherein the queue stores a virtual channel identifier for each multiplexed packet.

52. The method of claim 51, wherein each virtual channel accommodates plural connections.

53. The method of claim 49, wherein the multiplexed packet is an AAL2 packet and the carrying packet is an ATM cell.

54. A protocol multiplexing method comprising:
receiving, in a first queue, multiplexed packet(s) belonging to a first virtual channel;
receiving, in a second queue, multiplexed packet(s) belonging to a second virtual channel;
forming carrying packets with the multiplexed packet(s) obtained from the first queue and the second queue in a manner so that (1) a given carrying packet comprises multiplexed packets belonging to only one virtual channel; and (2) for a remainder multiplexed packet, any remainder contents of the remainder multiplexed packet is not used to form a carrying packet which is stored in an output buffer until a remainder finalization triggering event, the remainder multiplexed packet being a multiplexed packet having remainder contents, the remainder contents being a portion of the remainder multiplexed packet which would not be utilized in filling of a whole number of carrying packet(s);

maintaining a first data counter which counts how may carrying packets attributable to virtual channels other than the first virtual channel are formed and loaded into an output buffer subsequent to the multiplexing of the multiplexed packet belonging to the first virtual channel;

using contents of the first data counter to at least partially determine the remainder finalization triggering event.

55. The method of claim 54, further comprising determining the remainder finalization triggering event when the contents of the first data counter reaches a predetermined finite number.

56. The method of claim 54, further comprising, upon determining the remainder finalization triggering event, allowing a partially-filled carrying packet which bears the remainder contents obtained from the remainder multiplexed packet to be stored in the output buffer.

57. The method of claim 54, further comprising:
maintaining a first timer which, upon feeding of the remainder multiplexed packet belonging to the first virtual channel, times a first virtual channel delay interval;
if the contents of the first data counter has not reached a first virtual channel delay limit, also determining the remainder finalization triggering event in accordance with whether the timer is finished timing the first virtual channel delay interval.

58. The method of claim 54, wherein the carrying packet is of a predetermined carrying packet size.

59. The method of claim 54, wherein the multiplexed packet is an AAL2 packet and the carrying packet is an ATM cell.

60. A protocol multiplexing method comprising:
using multiplexed packet(s) to form carrying packets which are stored in an output buffer so that a given carrying packet comprises multiplexed packet(s) belonging to only one virtual channel;
maintaining a first pointer which tracks a last location in the buffer occupied by a last-fed-to-buffer multiplexed packet belonging to a first virtual channel;
maintaining a second pointer which tracks a payload end location in the output buffer occupied by a last-fed-to-buffer carrying packet belonging to a second virtual channel;
augmenting the last-fed-to-buffer carrying packet belonging to the first virtual channel at the location tracked by the first pointer with contents of a next-received multiplexed packet belonging to the first virtual channel.

61. The method of claim 60, wherein the carrying packet is of a predetermined carrying packet size.

62. The method of claim 60, wherein the multiplexed packet is an AAL2 packet and the carrying packet is an ATM cell.

63. The method of claim 60, further comprising:
receiving the multiplexed packets in a common queue, with some of the multiplexed packets received in the queue belonging to differing ones of plural virtual channels including the first virtual channel and the second first virtual channel;
maintaining a common timer which, if multiplexing of a multiplexed packet belonging to any of the plural virtual channels results in formation in the buffer of a partially-filled carrying packet, times a delay interval;
upon occurrence of a predetermined event, determining if a partially-filled carrying packet should be stored in the output buffer in accordance with whether the timer is finished timing the delay interval.

64. The method of claim 63, wherein when the predetermined event is arrival in the queue of another multiplexed packet, the another multiplexed packet belonging to a same virtual channel as the multiplexed packet that would result in formation of the partially-filled packet, the method further comprises allowing the multiplexer to use at least a portion of the another multiplexed packet in the carrying packet being formed if the timer is not finished timing the delay interval.

65. The method of claim 63, wherein when the predetermined event is arrival in the queue of another multiplexed packet, the another multiplexed packet belonging to a different virtual channel than the multiplexed packet that would result in formation of the partially-filled packet, the method further comprises storing the partially-filled packet in the output buffer if the timer is not finished timing the delay interval.

66. The method of claim 63, wherein when the predetermined event is the timer finishing timing the delay interval before arrival in the queue of another multiplexed packet, the method further comprises storing of the partially-filled packet in the output buffer.

67. The method of claim 63, wherein the queue stores a virtual channel identifier for each multiplexed packet.

68. The method of claim 67, wherein each virtual channel accommodates plural connections.

69. The method of claim 60, further comprising:
receiving, at a first queue, multiplexed packet(s) belonging to a first virtual channel;
receiving, at a second queue, multiplexed packet(s) belonging to a second virtual channel;
using a common multiplexer for forming carrying packets with the multiplexed packet(s) obtained from the first queue and the second queue in a manner so that for a remainder multiplexed packet, any remainder contents of the remainder multiplexed packet is not used to form a carrying packet until a remainder finalization triggering event, the remainder multiplexed packet being a multiplexed packet having remainder contents, the remainder contents being a portion of the remainder multiplexed packet which would not be utilized in filling of a whole number of carrying packet(s);
maintaining a first data counter which counts how many carrying packets attributable to virtual channels other than the first virtual channel are formed and loaded into an output buffer subsequent to the multiplexing of the multiplexed packet belonging to the first virtual channel;
using contents of the first data counter to at least partially determine the remainder finalization triggering event.

70. The method of claim 69, further comprising determining the remainder finalization triggering event when the contents of the first data counter reaches a predetermined finite number.

71. The method of claim 69, wherein upon determining the remainder finalization triggering event, further storing a partially-filled carrying packet which bears the remainder contents obtained from the remainder multiplexed packet in the output buffer.

* * * * *

UNITED STATES PATENT AND TRADEMARK OFFICE
CERTIFICATE OF CORRECTION

PATENT NO. : 7,158,527 B2
APPLICATION NO. : 10/113941
DATED : January 2, 2007
INVENTOR(S) : Malomsoky et al.

It is certified that error appears in the above-identified patent and that said Letters Patent is hereby corrected as shown below:

On the Title Page, in Field (73), under "Assignee", in Column 1, Line 1, delete "Lmeericsson" and insert -- LM Ericsson --, therefor.

In Column 2, Line 39, delete "502," and insert -- $502_1$ --, therefor.

In Column 2, Line 40, delete "502," and insert -- $502_1$ --, therefor.

In Column 8, Line 1, delete "1201, 1202," and insert -- $120_1$, $120_2$. --, therefor.

In Column 9, Line 46, delete "209," and insert -- $209_1$ --, therefor.

In Column 10, Line 20, delete "202," and insert -- $202_1$ --, therefor.

Signed and Sealed this

Twentieth Day of May, 2008

JON W. DUDAS
*Director of the United States Patent and Trademark Office*